US011894770B2

(12) United States Patent
Sun et al.

(10) Patent No.: US 11,894,770 B2
(45) Date of Patent: Feb. 6, 2024

(54) HIGH POWER VOLTAGE REGULATOR MODULE WITH DIFFERENT PLANE ORIENTATIONS

(71) Applicant: Tesla, Inc., Austin, TX (US)

(72) Inventors: Shishuang Sun, Cupertino, CA (US); Kevin Hurd, Redwood City, CA (US); Satyan Chandra, Mountain View, CA (US)

(73) Assignee: Tesla, Inc., Austin, TX (US)

( * ) Notice: Subject to any disclaimer, the term of this patent is extended or adjusted under 35 U.S.C. 154(b) by 644 days.

(21) Appl. No.: 16/762,481

(22) PCT Filed: Nov. 7, 2018

(86) PCT No.: PCT/IB2018/058744
§ 371 (c)(1),
(2) Date: May 7, 2020

(87) PCT Pub. No.: WO2019/092610
PCT Pub. Date: May 16, 2019

(65) Prior Publication Data
US 2020/0266705 A1     Aug. 20, 2020

Related U.S. Application Data

(60) Provisional application No. 62/584,605, filed on Nov. 10, 2017.

(51) Int. Cl.
*H02M 3/156*   (2006.01)
*G06F 1/20*   (2006.01)
(Continued)

(52) U.S. Cl.
CPC .............. *H02M 3/156* (2013.01); *G06F 1/20* (2013.01); *G06F 1/26* (2013.01); *H02M 1/126* (2013.01);
(Continued)

(58) Field of Classification Search
CPC .. H05K 1/0262; H05K 1/0207; H05K 7/2089; H05K 7/20; H05K 3/301;
(Continued)

(56) References Cited

U.S. PATENT DOCUMENTS 5,918,023 A * 6/1999 Reeves ............... G06F 13/4068
710/301
6,449,676 B1 * 9/2002 Johari .................... H02H 9/004
713/300

(Continued)

FOREIGN PATENT DOCUMENTS

DE          4035212      5/1992
EP          2 587 907    5/2013

OTHER PUBLICATIONS

International Search Report and Written Opinion dated May 16, 2019 in PCT/IB2018/058744.

*Primary Examiner* — Kevin J Comber
*Assistant Examiner* — Nusrat Quddus
(74) *Attorney, Agent, or Firm* — Knobbe, Martens, Olson & Bear, LLP (57) ABSTRACT

A Voltage Regulator Module (VRM) includes a first voltage rail circuit board oriented in a first plane having formed therein a first plurality of conductors and configured to produce a first rail voltage, a second voltage rail circuit board oriented in a second plane that is substantially parallel to the first plane having formed therein a second plurality of conductors and configured to produce a second rail voltage. The VRM also includes a first capacitor circuit board oriented in a third plane that is substantially perpendicular to the first plane and a second capacitor circuit board oriented in a fourth plane that is substantially parallel to the third plane. The VRM includes a plurality of conductors intercoupling the first voltage rail circuit board, the first capacitor (Continued)

circuit board, the second voltage rail circuit board, and the second capacitor circuit board.

18 Claims, 5 Drawing Sheets

(51) Int. Cl.
    *G06F 1/26*     (2006.01)
    *H02M 1/12*     (2006.01)
    *H02M 7/00*     (2006.01)

(52) U.S. Cl.
    CPC ....... *H02M 7/003* (2013.01); *G06F 2200/201* (2013.01)

(58) Field of Classification Search
    CPC ......... H05K 3/0224; H05K 3/023; H02J 1/12; G05F 1/10; H01L 24/13; H01L 2224/13025; H02M 3/156; H02M 1/126; H02M 7/003; G06F 1/20; G06F 1/26; G11B 33/12; G11B 33/142
    See application file for complete search history.

(56) References Cited

U.S. PATENT DOCUMENTS

| | | | |
|---|---|---|---|
| 6,816,486 B1 | 11/2004 | Rogers | |
| 9,589,598 B1 | 3/2017 | Gilley et al. | |
| 10,887,982 B2* | 1/2021 | Nasr | H05K 1/0262 |
| 11,570,889 B2* | 1/2023 | Nasr | H05K 1/0209 |
| 2002/0057554 A1* | 5/2002 | Dibene, II | G06F 1/182 |
| | | | 361/720 |
| 2003/0156400 A1* | 8/2003 | Dibene, II | H01R 12/7088 |
| | | | 257/E23.09 |
| 2004/0124829 A1* | 7/2004 | Swettlen | G01R 1/07378 |
| | | | 324/754.07 |
| 2005/0018406 A1* | 1/2005 | Harris | H05K 1/144 |
| | | | 257/E23.101 |
| 2005/0035436 A1* | 2/2005 | Novak | H01L 23/50 |
| | | | 257/E23.079 |
| 2006/0131071 A1* | 6/2006 | Hiramatsu | H05K 3/0035 |
| | | | 174/266 |
| 2009/0160259 A1 | 6/2009 | Ravindranath et al. | |
| 2012/0063108 A1* | 3/2012 | Kim | H05K 1/0231 |
| | | | 174/250 |
| 2016/0261179 A1* | 9/2016 | Blanchard | H02M 1/088 |
| 2019/0029140 A1* | 1/2019 | Wataru | H05K 7/1432 |
| 2019/0115318 A1* | 4/2019 | Samra | H01L 25/18 |
| 2020/0381351 A1* | 12/2020 | Calugaru | H01L 23/3672 |

* cited by examiner

HIGH POWER VOLTAGE REGULATOR MODULE WITH DIFFERENT PLANE ORIENTATIONS

CROSS-REFERENCE TO RELATED APPLICATION

The present application claims priority pursuant to 35 U.S.C. 119(e) to U.S. Provisional Patent Application No. 62/584,605, entitled "HIGH POWER VOLTAGE REGULATOR MODULE", filed 10 Nov. 2017, which is incorporated herein by reference in its entirety for all purposes.

BACKGROUND OF THE INVENTION

Technical Field

The present invention relates generally to power electronics, and more specifically to voltage regulators.

Description of Related Art

Power conversion is generally known. One particular application of power conversion electronics is the powering of Integrated Circuits (ICs) in which voltage at a higher level is converted to a voltage at a lower level that corresponds to the ICs. Rectifiers convert AC voltage to DC voltage where required. A Voltage Regulator Module (VRM) may be used to convert a voltage received from a battery or other DC source, e.g., rectifier, to a lower voltage for use by an IC. The requirement of high power for the ICs, e.g., in excess of 500 watts, at relatively low voltages, e.g., less than one volt, creates design problems for the VRM. The VRM must supply the low DC voltage at many hundreds of amperes. Typically, VRMs are space constrained making the locating of thousands or millions of components in close proximity difficult.

SUMMARY

Embodiments of the present disclosure are directed towards a high-power Voltage Regulator Module (VRM). The high-power VRM includes a first voltage rail circuit board, a second voltage rail circuit board, a first capacitor circuit board, and a second capacitor circuit board. The first voltage rail circuit board is oriented in a first plane and has formed therein a first plurality of conductors, and has mounted thereon a first plurality of VRM elements, a first plurality of inductors coupled to the first plurality of VRM elements, and a first plurality of capacitors, and is configured to produce a first rail voltage. The second voltage rail circuit board is oriented in a second plane that is substantially parallel to the first plane, the second voltage rail circuit board having formed therein a second plurality of conductors, and having mounted thereon a second plurality of VRM elements, a second plurality of inductors coupled to the second plurality of VRM elements, and a second plurality of capacitors, and is configured to produce a second rail voltage.

The first capacitor circuit board is oriented in a third plane that is substantially perpendicular to the first plane, the first capacitor circuit board having formed therein a third plurality of conductors, and having mounted thereon a third plurality of capacitors. The second capacitor circuit board is oriented in a fourth plane that is substantially parallel to the third plane, the second capacitor circuit board having formed therein a fourth plurality of conductors, and having mounted thereon a fourth plurality of capacitors. A fifth plurality of conductors couples the first voltage rail circuit board to the first capacitor circuit board and to the second capacitor circuit board. A sixth plurality of conductors couples the second voltage rail circuit board to the first capacitor circuit board and to the second capacitor circuit board.

The high-power VRM provides important benefits as compared to the prior devices. The configuration of the circuit boards of the high-power VRM allows the high-power VRM to have a relatively small footprint for the relatively large number of components it includes. This allows the high-power VRM to have a footprint similar in area to an Integrated Circuit (IC) die that it services. Further, by having the first voltage rail circuit board and the second voltage rail circuit board oriented vertically, with reference to a horizontal orientation of the capacitor circuit board and the second capacitor circuit board (and the IC die), heat generated by the components of the high-power VRM is more easily dissipated.

The high-power VRM of the present disclosure may include various optional aspects, which may be combined singularly or in any various combination. According to a first aspect, a seventh plurality of conductors couples the first capacitor circuit board to the second capacitor circuit board. According to a second aspect, the fifth plurality of conductors couples to a first outer portion of the first capacitor circuit board and to a first outer portion of the second capacitor circuit board and the sixth plurality of conductors couples to a first outer portion of the second capacitor circuit board and to a second outer portion of the second capacitor circuit board. According to a third aspect, the seventh plurality of conductors couples between a central portion of the first capacitor circuit board and a central portion of the second capacitor circuit board.

According to a fourth aspect, the third plurality of capacitors are configured to filter medium to low frequency components of the first rail voltage and the second rail voltage and the fourth plurality of capacitors are configured to filter high frequency components of the first rail voltage and the second rail voltage. According to a fifth aspect, the high power VRM is configured to receive a supply voltage across the first voltage rail circuit board and the second voltage rail circuit board and produce an output voltage at a voltage less than the supply voltage. In various configurations, the supply voltage is approximately 40 volts and the output voltage is approximately 0.8 volts. According to a sixth aspect, the second capacitor circuit board includes a plurality of solder ball connections to deliver the output voltage to an Integrated Circuit (IC).

According to a seventh aspect, the high power VRM further includes a cooling system sink and piping coupled to the cooling system sink and configured to cool the first plurality of VRM elements, the first plurality of inductors, the second plurality of VRM elements, and the second plurality of inductors.

These and other benefits of the present disclosure will be understood further from the following descriptions.

DETAILED DESCRIPTION

Figure 1:
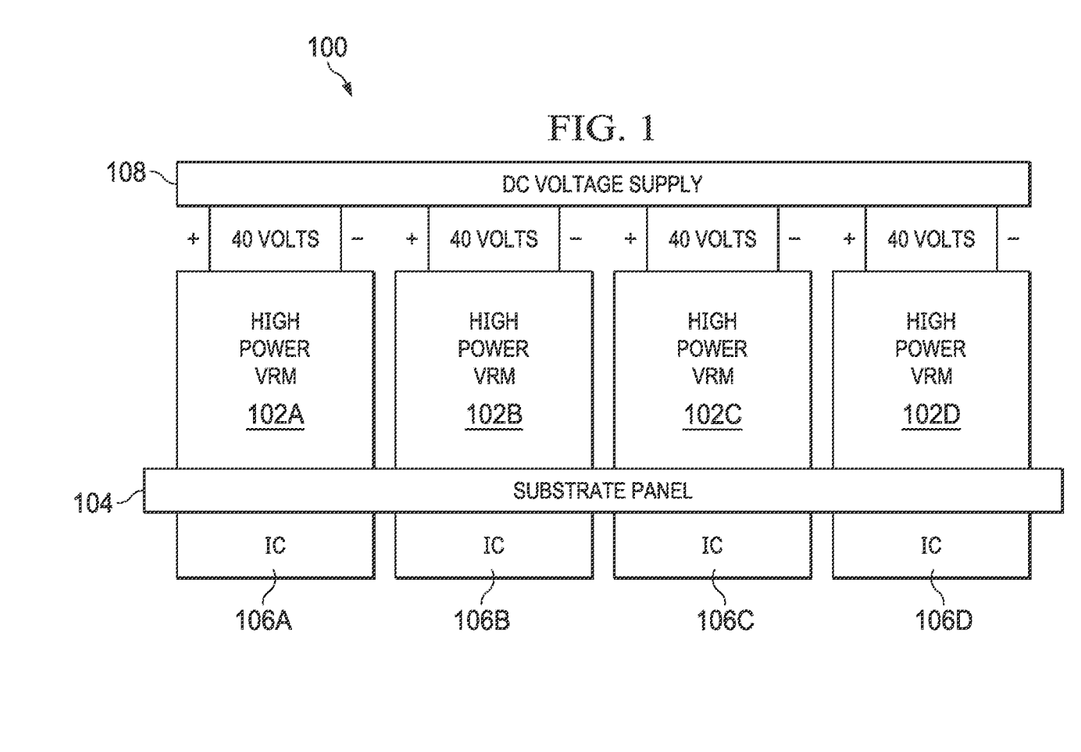
FIG. 1 is a block diagram illustrating a processing system that includes a plurality of multiple circuit board high power Voltage Regulator Modules (VRMs) constructed according to the present disclosure.

FIG. 1 is a block diagram illustrating a processing system that includes a plurality of multiple circuit board high power Voltage Regulator Modules (VRMs) constructed according to the present disclosure. The processing system 100 of FIG. 1 includes a plurality of multiple circuit board high power VRMs 102A, 102B, 102C, and 102D constructed according to the present disclosure that mounted on a substrate panel 104. The plurality of multiple circuit board high power VRMs 102A, 102B, 102C, and 102D are fed by a DC supply voltage 108, at 40 volts in some embodiments and respectively service a plurality of Integrated Circuits (ICs) 106A, 106B, 106C, and 106D and produce respective output voltages. In some embodiments, each of the plurality of multiple circuit board high power VRMs 102A, 102B, 102C, and 102D produces an output voltage of approximately 0.8 volts and provides 600 watts of power or more to the respective plurality of ICs 106A, 106B, 106C, and 106D. Thus, each of the plurality of multiple circuit board high power VRMs 102A, 102B, 102C, and 102D produces in excess of 100 amperes of current to the plurality of ICs 106A, 106B, 106C, and 106D.

Because each of the plurality of multiple circuit board high power VRMs 102A, 102B, 102C, and 102D produces an output of approximately 0.8 volts to the respective plurality of ICs 106A, 106B, 106C, and 106D and it is desirable for the footprint of the VRMs 102A-102D to be approximately the same as the footprints of the plurality of ICs 106A-106D. In some embodiments, the footprint is approximately 3 centimeters by 3 centimeters, 4 centimeters by 4 centimeters, or other relatively small dimensions (that need not be square) that approximate the surface area of the plurality of ICs 106A, 106B, 106C, and 106D. However, in order to produce power at low voltage and high power, the plurality of VRMs 102A-102D must include a relatively large number of discrete components.

Thus, according to the present disclosure, the plurality of multiple circuit board high power VRMs 102A, 102B, 102C, and 102D include circuit boards that are disposed in planes both parallel to the substrate panel 104 and in planes perpendicular to the substrate panel 104. One embodiment that will be described with reference to FIGS. 2, 3A, 3B, and 4 includes two circuit boards oriented perpendicular to the substrate panel 104 and two circuit boards oriented parallel to the substrate panel 104. With this structure, the VRMs 102A, 102B, 102C, and 102D extend above the substrate panel 104 in a direction perpendicular to the substrate panel.

Figure 2:
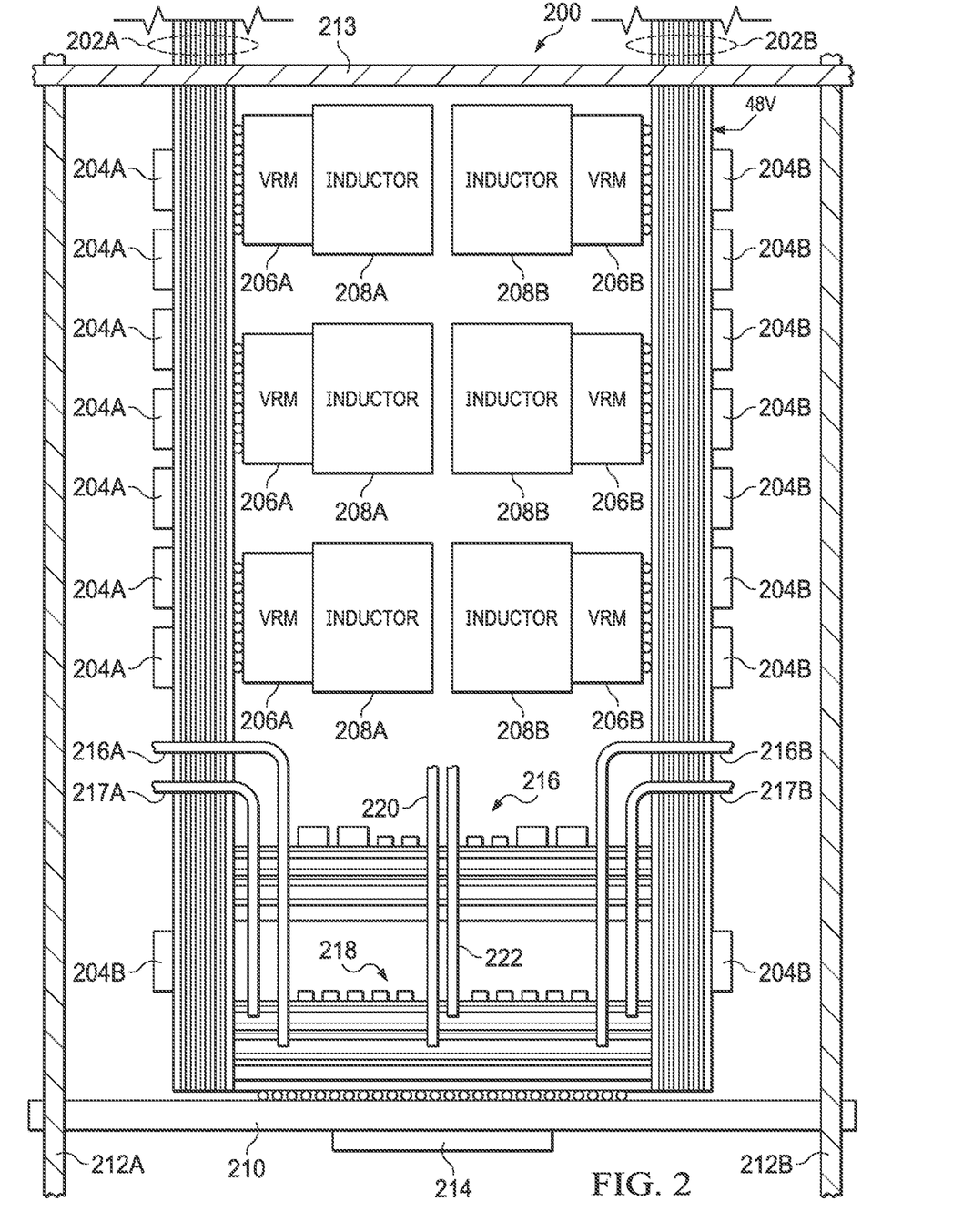
FIG. 2 is a block schematic diagram illustrating a multiple circuit board high power VRM according to the present disclosure.

FIG. 2 is a block schematic diagram illustrating a multiple circuit board high power VRM according to the present disclosure. The multiple circuit board high power VRM 200 includes a first voltage rail circuit board 202A, a second voltage rail circuit board 202B, a first capacitor circuit board 216, and a second capacitor circuit board 218. These components are mounted on rails 212A and 212B and on top brace 213, the rails 212A and 212B coupling to a substrate panel 210 using screws, for example. The second capacitor board 218 may couple to the substrate panel 210 via solder balls, which may have a pitch of 1 mm. The electrical connection formed by the substrate panel 210 couples a first rail voltage and a second rail voltage to die 214 mounted on an opposite side of the substrate panel 210.

The first voltage rail circuit board 202A is oriented in a first plane, has formed therein a first plurality of conductors (in a plurality of layers), and having mounted thereon a first plurality of VRM elements 206A, a first plurality of inductors 208A coupled to the first plurality of VRM elements 206A, and a first plurality of capacitors 204A. The first voltage rail circuit board 202A is configured to receive a first voltage and to produce the first rail voltage. The second voltage rail circuit board 202B is oriented in a second plane that is substantially parallel to the first plane, includes a second plurality of conductors formed therein (in a plurality of layers), and has mounted thereon a second plurality of VRM elements 206B, a second plurality of inductors 208B coupled to the second plurality of VRM elements 206B, and a second plurality of capacitors 204B. The second voltage rail circuit board 202B is configured to receive a second voltage and to produce the second rail voltage. The first and second voltages may be received from a battery pack within an electric vehicle.

The VRM elements 206A and/or 206B may each include one or more switching power supplies that are formed in a semiconductor device. The VRM elements 206A and 206B may also or otherwise include a plurality of discrete electronic components. Each of the VRM elements 206A and 206B provides a portion of the total voltage conversion function required, e.g., provide a portion of the output current required. While three VRM elements 206A and three VRM elements 206B are shown in the FIGs., greater or fewer VRM elements 206A or 206B may be included in differing embodiments.

The first capacitor circuit board 216 is oriented in a third plane that is substantially perpendicular to the first plane and has formed therein a third plurality of conductors. The first capacitor circuit board has mounted thereon a third plurality of capacitors. The second capacitor circuit board 218 is oriented in a fourth plane that is substantially parallel to the third plane and includes, has formed therein, a fourth plurality of conductors, and has mounted thereon a fourth plurality of capacitors.

The multiple circuit board high power VRM 200 further includes a fifth plurality of conductors 216A and 217A coupling the first voltage rail circuit board 202A to the first capacitor circuit board 216 and to the second capacitor circuit board 218. The multiple circuit board high power VRM 200 further includes a sixth plurality of conductors 216B and 217B coupling the second voltage rail circuit board 202B to the first capacitor circuit board 216 and to the second capacitor circuit board 216. The high power VRM of claim 1, further comprising a seventh plurality of conductors 220 and 222 coupling the first capacitor circuit board 216 to the second capacitor circuit board 218.

Figure 3A:
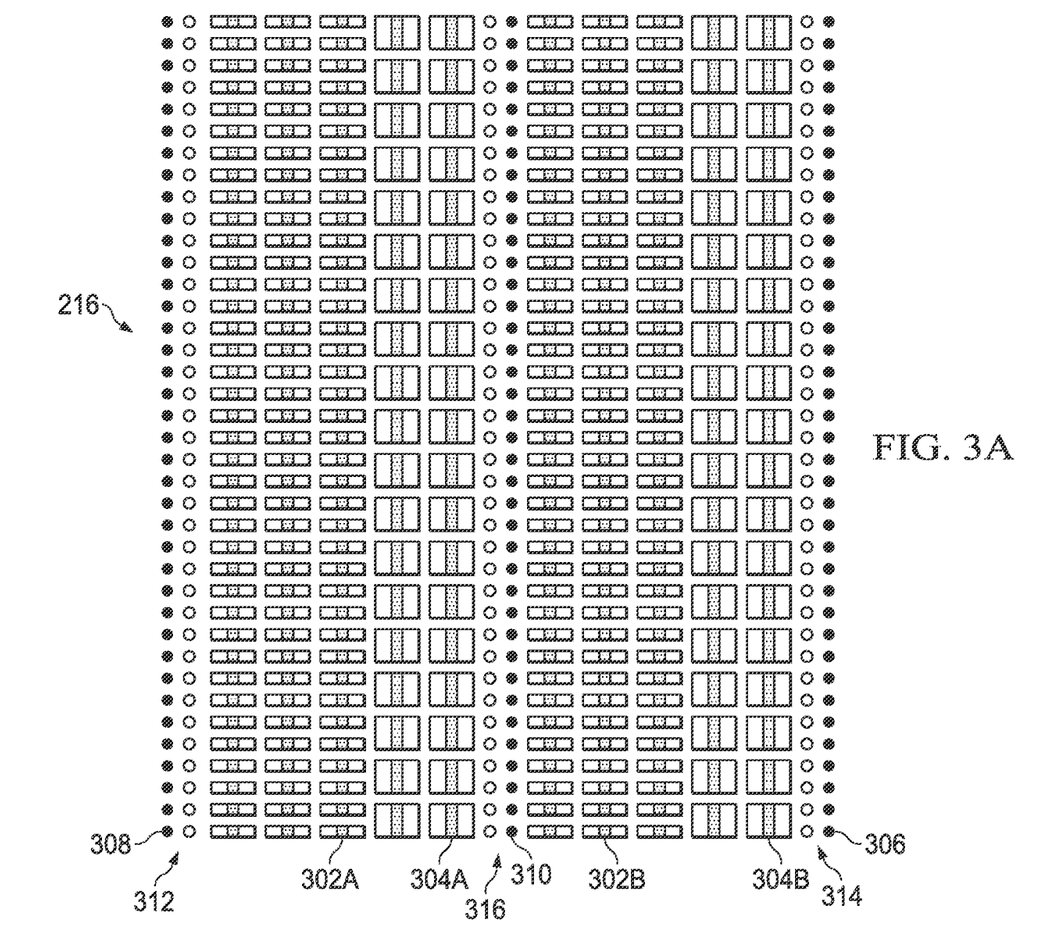
FIG. 3A is a block schematic diagram illustrating a first capacitor circuit board of the multiple circuit board high power VRM of FIG. 2.

FIG. 3A is a block schematic diagram illustrating a first capacitor circuit board of the multiple circuit board high power VRM of FIG. 2. The first capacitor circuit board 216 includes the third plurality of capacitors 302A, 304A, 302B, and 304B. Note that the capacitors 302A and 304A are located on a first side of the first capacitor circuit board 216 and that the capacitors 302B and 304B are located on a second side of the first capacitor circuit board 216. The fifth plurality of conductors 216A and 217A couple to connectors 308 of the first capacitor circuit board 216. Further, the sixth plurality of conductors 216B and 217B couple to connectors 306 of the first capacitor circuit board 216. The seventh plurality of conductors 220 and 222 couple to connectors 310 of the first capacitor circuit board 216.

Figure 3B:
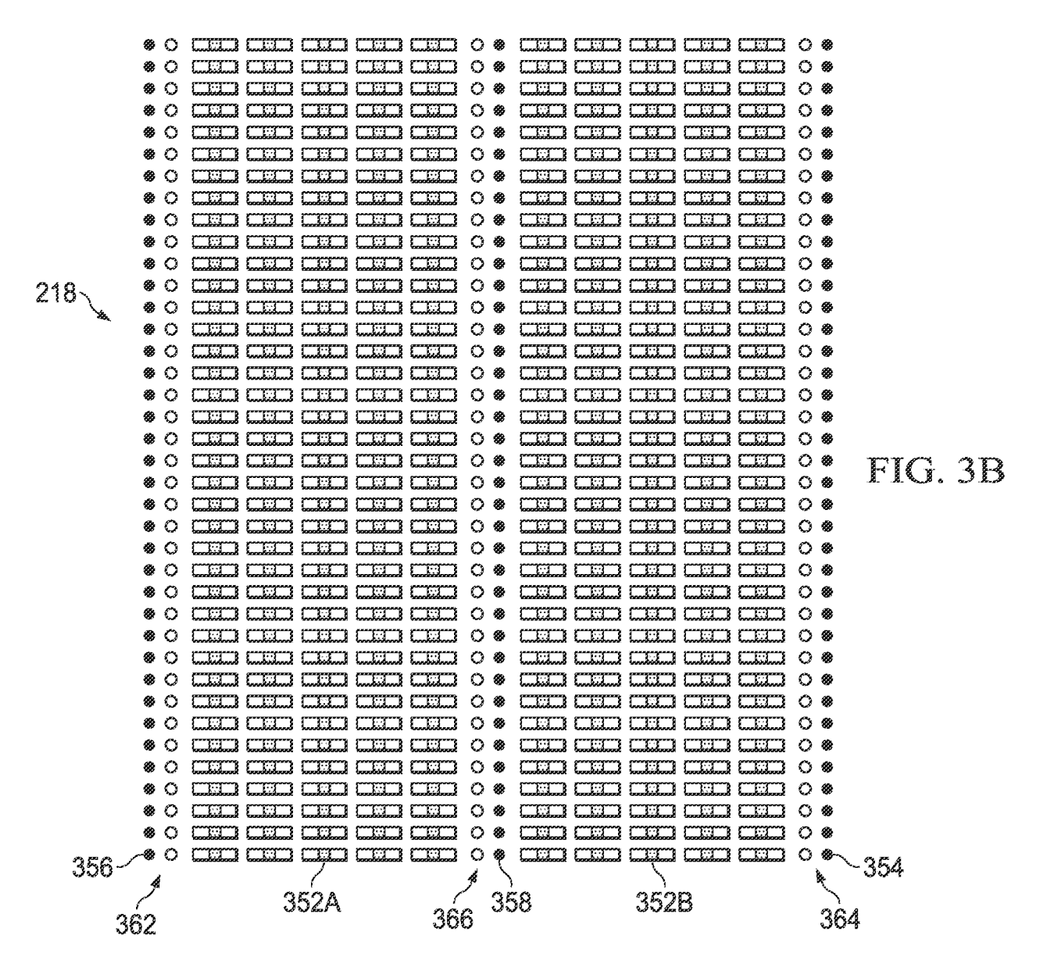
FIG. 3B is a block schematic diagram illustrating a second capacitor circuit board of the multiple circuit board high power VRM of FIG. 2.

FIG. 3B is a block schematic diagram illustrating a second capacitor circuit board of the multiple circuit board high power VRM of FIG. 2. The second capacitor circuit board 218 includes the fourth plurality of capacitors 352A, 354A, 352B, and 354B. Note that the capacitors 352A and 354A are located on a first side of the second capacitor circuit board 218 and that the capacitors 352B and 354B are located on a second side of the second capacitor circuit board 218. The fifth plurality of conductors 216A and 217A couple to connectors 356 of the second capacitor circuit board 218. Further, the sixth plurality of conductors 216B and 217B couple to connectors 354 of the second capacitor circuit board 218. The seventh plurality of conductors 220 and 222 couple to connectors 358 of the second capacitor circuit board 218.

Referring to both FIGS. 3A and 3B, the fifth plurality of conductors 216A and 217A couples to a first outer portion 312 of the first capacitor circuit board 216 and to a first outer portion 362 of the second capacitor circuit board 218. Further the sixth plurality of conductors 216B and 217B couples to a second outer portion 314 of the first capacitor circuit board 216 and to a second outer portion 364 of the second capacitor circuit board 218. Moreover, the seventh plurality of conductors 220 and 222 couples between a central portion 316 of the first capacitor circuit board 216 and a central portion 366 of the second capacitor circuit board 218.

Still referring to both FIGS. 3A and 3B, the third plurality of capacitors 302A, 304A, 302B, and 304B are configured to filter medium to low frequency components of the first rail voltage and the second rail voltage and the fourth plurality of capacitors 352A and 352B are configured to filter high frequency components of the first rail voltage and the second rail voltage.

With the embodiments of FIGS. 2, 3A and/or 3B, the input voltage received by the first voltage rail circuit board 202A and the second voltage rail circuit board 202B may be 40 volts with 0.8-volt signals used for communications therewith. In other embodiments, a higher rail voltage, like 48 volts, may be used.

Figure 4:
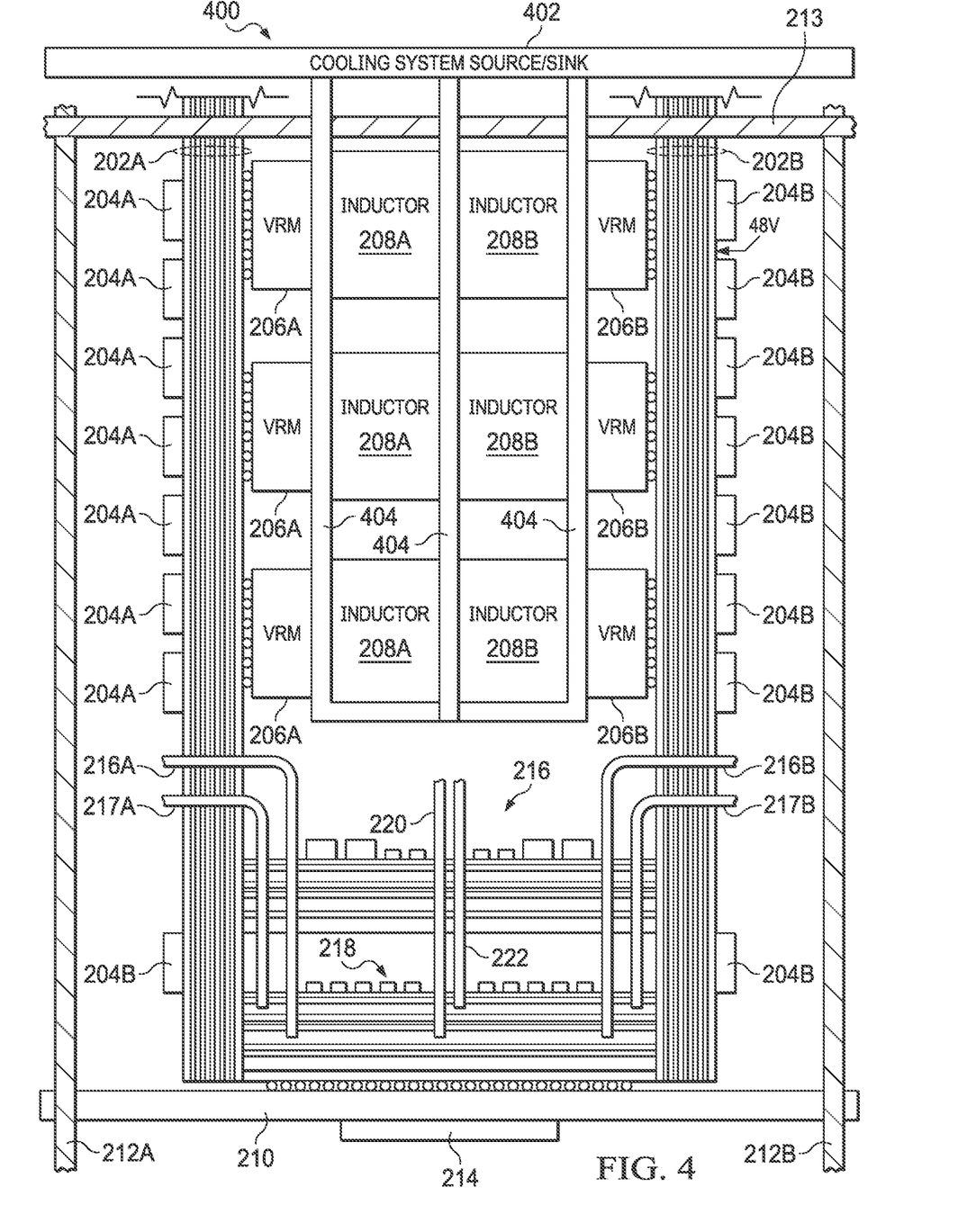
FIG. 4 is a block schematic diagram illustrating cooling system components of a multiple circuit board high power VRM according to the present disclosure.

FIG. 4 is a block schematic diagram illustrating cooling system components of a multiple circuit board high power VRM according to the present disclosure. The difference between the embodiment 200 of FIG. 2 and the embodiment 400 of FIG. 4 is the inclusion of the cooling system components. The first plurality of VRM elements 206A, the first plurality of inductors 208A, the second plurality of VRM elements 206B, the second plurality of inductors 208B produce significant heat in their operation. Thus, the multiple circuit board high power VRM includes a cooling system to cool these components. A cooling system source/sink 402 couples to piping 404 to service the flow of coolant to cool the VRM elements 206A/206B and the inductors 208A/208B. In certain embodiments, piping 404 runs in between VRM elements 206A/206B. The piping 404 may include many segments. The piping 404 may couple directly to the VRM elements 206A/206B and the inductors 208A/208B or be thermally coupled thereto by intermediate structures. The cooling system source/sink 402 may service multiple circuit board high power VRMs as were illustrated in FIG. 1.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the teachings herein.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted therewith.

What is claimed is:

1. A high-power Voltage Regulator Module (VRM) comprising:

a first voltage rail circuit board oriented in a first plane, comprising a first plurality of VRM elements, the first voltage rail circuit board being configured to produce a first rail voltage;

a second voltage rail circuit board comprising a second plurality of VRM elements, the second voltage rail circuit board being oriented in a second plane that is substantially parallel to the first plane, and the second voltage rail circuit board being configured to produce a second rail voltage;

a first capacitor circuit board oriented in a third plane that is substantially perpendicular to the first plane;

a second capacitor circuit board oriented in a fourth plane that is substantially parallel to the third plane;

a first plurality of conductors coupling the first voltage rail circuit board to the first capacitor circuit board and to the second capacitor circuit board; and a second plurality of conductors coupling the second voltage rail circuit board to the first capacitor circuit board and to the second capacitor circuit board.

2. The high power VRM of claim 1, wherein:
the first capacitor circuit board having mounted thereon a third plurality of capacitors, the third plurality of capacitors being configured to filter medium to low frequency components of the first rail voltage and the second rail voltage; and the second capacitor circuit board having mounted thereon a fourth plurality of capacitors the fourth plurality of capacitors being configured to filter high frequency components of the first rail voltage and the second rail voltage.

3. The high power VRM of claim 1, wherein the high power VRM is configured to:
receive a supply voltage across the first voltage rail circuit board and the second voltage rail circuit board; and
produce an output voltage at a voltage less than the supply voltage.

4. The high power VRM of claim 3, wherein:
the supply voltage is approximately 40 volts; and the output voltage is approximately 0.8 volts.

5. The high power VRM of claim 3, wherein the second capacitor circuit board includes a plurality of solder ball connections to deliver the output voltage to an Integrated Circuit (IC).

6. The high power VRM of claim 1, further comprising:
a cooling system sink; and
piping coupled to the cooling system sink and configured to cool the first plurality of VRM elements and the second plurality of VRM elements.

7. A high-power Voltage Regulator Module (VRM) comprising:
a first voltage rail circuit board oriented in a first plane, having formed therein a first plurality of conductors and configured to produce a first rail voltage;

a second voltage rail circuit board oriented in a second plane that is substantially parallel to the first plane, the second voltage rail circuit board having formed therein a second plurality of conductors and configured to produce a second rail voltage;

a first capacitor circuit board oriented in a third plane that is substantially perpendicular to the first plane, the first capacitor circuit board having formed therein a third plurality of conductors, and having a third plurality of capacitors;

a second capacitor circuit board oriented in a fourth plane that is substantially parallel to the third plane, the second capacitor circuit board having formed therein a fourth plurality of conductors, and having a fourth plurality of capacitors;

a fifth plurality of conductors coupling the first voltage rail circuit board to the first capacitor circuit board and to the second capacitor circuit board; and a sixth plurality of conductors coupling the second voltage rail circuit board to the first capacitor circuit board and to the second capacitor circuit board.

8. The high power VRM of claim 7, further comprising a seventh plurality of conductors coupling the first capacitor circuit board to the second capacitor circuit board.

9. The high power VRM of claim 8, wherein:
the fifth plurality of conductors couples to a first outer portion of the first capacitor circuit board and to a first outer portion of the second capacitor circuit board; and the sixth plurality of conductors couples to a first outer portion of the second capacitor circuit board and to a second outer portion of the second capacitor circuit board.

10. The high power VRM of claim 9, wherein the seventh plurality of conductors couples between a central portion of the first capacitor circuit board and a central portion of the second capacitor circuit board.

11. The high power VRM of claim 7, wherein:
the first capacitor circuit board includes a plurality of capacitors configured to filter medium to low frequency components of the first rail voltage and the second rail voltage; and the second capacitor circuit board includes a fourth plurality of capacitors configured to filter high frequency components of the first rail voltage and the second rail voltage.

12. The high power VRM of claim 7, wherein the high power VRM is configured to:
receive a supply voltage across the first voltage rail circuit board and the second voltage rail circuit board; and
produce an output voltage at a voltage less than the supply voltage.

13. The high power VRM of claim 12, wherein:
the supply voltage is approximately 40 volts; and the output voltage is approximately 0.8 volts.

14. The high power VRM of claim 12, wherein the second capacitor circuit board includes a plurality of solder ball connections to deliver the output voltage to an Integrated Circuit (IC).

15. The high power VRM of claim 7, further comprising:
a cooling system sink; and
piping coupled to the cooling system sink and configured to cool components of the first voltage rail circuit board and to cool components of the second voltage rail circuit board.

16. The high power VRM of claim 1, wherein each of the VRM elements is configured to produce at least 600 watts of power at about 0.8 volts.

17. The high power VRM of claim 1, wherein each of the VRM elements is configured to provide at least 100 amperes of current to the first capacitor circuit board and second capacitor circuit board.

18. The high power VRM of claim 6, wherein the piping runs between the first plurality of VRM elements and the second plurality of VRM elements.

* * * * *